(12) United States Patent
Shiratori et al.

(10) Patent No.: US 12,110,576 B2
(45) Date of Patent: Oct. 8, 2024

(54) WC-BASED CEMENTED CARBIDE POWDER, WC-BASED CEMENTED CARBIDE MEMBER, AND MANUFACTURING METHOD FOR WC-BASED CEMENTED CARBIDE MEMBER

(71) Applicant: Hitachi Metals, Ltd., Tokyo (JP)

(72) Inventors: Hiroshi Shiratori, Tokyo (JP); Kazuya Shinagawa, Tokyo (JP); Shuho Koseki, Tokyo (JP); Kousuke Kuwabara, Tokyo (JP); Yasuhiko Otsubo, Tokyo (JP); Shinya Okamoto, Tokyo (JP)

(73) Assignee: Proterial, Ltd., Tokyo (JP)

( * ) Notice: Subject to any disclaimer, the term of this patent is extended or adjusted under 35 U.S.C. 154(b) by 58 days.

(21) Appl. No.: 17/636,602

(22) PCT Filed: Aug. 27, 2020

(86) PCT No.: PCT/JP2020/032389
§ 371 (c)(1),
(2) Date: Feb. 18, 2022

(87) PCT Pub. No.: WO2021/039912
PCT Pub. Date: Mar. 4, 2021

(65) Prior Publication Data
US 2022/0290276 A1 Sep. 15, 2022

(30) Foreign Application Priority Data
Aug. 27, 2019 (JP) .................................. 2019-154352

(51) Int. Cl.
*C22C 32/00* (2006.01)
*B22F 1/00* (2022.01)
(Continued)

(52) U.S. Cl.
CPC ............ *C22C 32/0052* (2013.01); *B22F 1/00* (2013.01); *B22F 10/64* (2021.01); *B33Y 40/20* (2020.01);
(Continued)

(58) Field of Classification Search
None
See application file for complete search history.

(56) References Cited

U.S. PATENT DOCUMENTS

2017/0058385 A1  3/2017  Umemori et al.
2019/0001414 A1  1/2019  Konyashin et al.

FOREIGN PATENT DOCUMENTS

CN  104264026 A  1/2015
CN  10475910 A   7/2015
(Continued)

OTHER PUBLICATIONS

International Search Report (PCT/ISA/210) issued in PCT Application No. PCT/JP2020/032389 dated Nov. 2, 2020 with English translation (five (5) pages).
(Continued)

*Primary Examiner* — Xiaobei Wang
(74) *Attorney, Agent, or Firm* — Crowell & Moring LLP (57) ABSTRACT

Provided are a WC-based cemented carbide powder from which a WC-based cemented carbide member excellent in high thermal conductivity and high abrasion resistance can be manufactured, a WC-based cemented carbide member, and a manufacturing method for a WC-based cemented carbide member. The WC-based cemented carbide powder of the present invention includes WC, Cu, and at least one of Co, Fe, and Cr. The content of WC is equal to or more than 40 mass %, the content of at least one of Co, Fe, and Cr is equal to or more than 25 mass % and less than 60 mass %, and the ratio a/b of the content 'a' of Cu and the content (Continued)

'b' of at least one of Co, Fe, and Cr satisfies $0.070 \leq a/b \leq 1.000$.

13 Claims, 4 Drawing Sheets

(51) Int. Cl.
  *B22F 10/64*  (2021.01)
  *B33Y 40/20*  (2020.01)
  *B33Y 70/00*  (2020.01)
  *B33Y 80/00*  (2015.01)
  *C22C 29/08*  (2006.01)

(52) U.S. Cl.
  CPC .............. *B33Y 70/00* (2014.12); *B33Y 80/00* (2014.12); *C22C 29/08* (2013.01); *B22F 2201/10* (2013.01); *B22F 2302/10* (2013.01); *Y10T 428/12014* (2015.01)

(56) References Cited

FOREIGN PATENT DOCUMENTS

| | | |
|---|---|---|
| CN | 104745910 A | 7/2015 |
| JP | 47-9886 B1 | 3/1972 |
| JP | 55-11133 A | 1/1980 |
| JP | H01-294843 * | 11/1989 |
| JP | 2003277861 A * | 10/2003 |
| JP | 2016-160500 A | 9/2016 |
| JP | 2017-43814 A | 3/2017 |
| JP | 2018-508393 A | 3/2018 |
| JP | 2019-502823 A | 1/2019 |
| WO | WO 2016/149301 A1 | 9/2016 |

OTHER PUBLICATIONS

Japanese-language Written Opinion (PCT/ISA/237) issued in PCT Application No. PCT/JP2020/032389 dated Nov. 2, 2020 (three (3) pages).

Kyogoku et al., "Direct Selective Laser Melting of WC Cemented Carbide," Kindai University Fundamental Technology for Next Generation Research Institute Reports, 2011, pp. 95-100, vol. 2, with English-language abstract and partial translation (six (6) pages).

Extended European Search Report issued in European Application No. 20858317.9 dated Jul. 18, 2023 (9 pages).

Chinese-language Office Action issued in Chinese Application No. 202080059893.0 dated May 29, 2024 with English translation (17 pages).

Chonggao, B., "Anti-wear Composite Materials", Xian Jiatong University Press, Oct. 31, 2010, pp. 110-111, with partial English translation (6 pages).

* cited by examiner

WC-BASED CEMENTED CARBIDE POWDER, WC-BASED CEMENTED CARBIDE MEMBER, AND MANUFACTURING METHOD FOR WC-BASED CEMENTED CARBIDE MEMBER

TECHNICAL FIELD

The present invention relates to a WC-based cemented carbide powder, a WC-based cemented carbide member, and a manufacturing method for a WC-based cemented carbide member.

BACKGROUND ART

A hot stamp production method is a production method in which a workpiece heated to a high temperature is press molded and, simultaneously, cooled in the mold to perform quenching. In the hot stamp mold, for enhancing quenching property and for realizing high efficiency of production, enhancement of thermal conductivity of the mold material is desired. In addition, for reducing damages to the mold by a scale adhering to the workpiece heated to a high temperature, abrasion resistance is needed.

For example, Patent Document 1 discloses a steel for mold which includes Fe as a main constituent and which secures both thermal conductivity and abrasion resistance. As a hot stamp mold material, a hot tool steel excellent in balance of hardness and toughness and a cold tool steel with very high hardness are used. However, while the tool steels are excellent in abrasion resistance, enhancement of their thermal conductivity is limited due to addition of many kinds of elements, and further enhancement of thermal conductivity is being desired.

As one of materials securing both thermal conductivity and abrasion resistance, a cemented carbide which is a composite material having hard WC dispersed in a metallic bonding phase of Co or the like (hereinafter referred to as a WC-based cemented carbide) may be mentioned. The WC-based cemented carbide, due to its excellent abrasion resistance, is used for a cutting tool and the like. On the other hand, also excellent in thermal conductivity, the WC-based cemented carbide is high in thermal conductivity as compared to tool steels.

As an example of the WC-based cemented carbide, Patent Document 2 discloses a WC—Co cemented carbide excellent in hardness and toughness and a manufacturing method thereof. It is said that an increase of the content of the metallic bonding phase in the WC-based cemented carbide is effective for enhancing toughness of the WC-based cemented carbide (see Patent Document 2).

In the case of using the WC-based cemented carbide for a hot stamp mold, since cracks are generated if the hardness is too high, it is necessary to increase the amount of the metallic bonding phase to enhance toughness. However, an increase in the amount of the metallic bonding phase leads to the problem of lowering of thermal conductivity. In addition, when it is intended to shape a mold by a liquid phase sintering method which is a general forming method of a cemented carbide, it is difficult to form a complicated internal cooling water channel structure, and, further, deformation due to its own weight occurs at the time of sintering, so that there is a problem that the cooling water channel is deformed.

In recent years, more attention has been paid to the Additive Manufacturing method (AM method) in which a metallic powder raw material is locally melted and solidified and this is repeated to manufacture a three dimensional shaped body. By use of the additive manufacturing method (in the present invention, referred to as an additive manufacturing method), it becomes possible to shape a complicated shape such as a hollow shape, so that a mold having a complicated cooling water channel can be shaped.

Non-patent Document 1 describes a technology concerning laser additive manufacturing of a WC—Co-based cemented carbide.

PRIOR ART DOCUMENT

Patent Documents

Patent Document 1: JP-2017-43814-A
Patent Document 2: JP-2016-160500-A

Non-Patent Document

Non-patent Document 1: Hideki Kyogoku, Akihiko Ikuta, Takeshi Uemori, Takayuki Shirachi, Kenichi Yoshikawa, Hitoshi Omori, "Direct Selective Laser Melting of WC Cemented Carbide," Kindai University Fundamental Technology for Next Generation Research Institute Reports, Vol. 2 (2011), 95-100

SUMMARY OF THE INVENTION

Problem to be Solved by the Invention

From the foregoing, by manufacturing a mold by the additive manufacturing method using a WC-based cemented carbide powder, deformation at the time of manufacturing can be restrained. However, lowering in thermal conductivity due to an increase in the amount of the metallic bonding phase is still left as a problem. Therefore, in the case of applying the additive manufacturing method, there has been a problem of securing both high thermal conductivity and high abrasion resistance.

In view of this, it is an object of the present invention to enhance thermal conductivity of a WC-based cemented carbide having a high content of a metallic bonding phase and to thereby provide a WC-based cemented carbide powder from which a WC-based cemented carbide member excellent in high thermal conductivity and high abrasion resistance can be manufactured by the additive manufacturing method, a WC-based cemented carbide member, and a manufacturing method for a WC-based cemented carbide member.

Means for Solving the Problem

One mode of a WC-based cemented carbide powder of the present invention includes WC, Cu, and at least one of Co, Fe, and Cr. The content of WC is equal to or more than 40 mass %, the content of at least one of Co, Fe, and Cr is equal to or more than 25 mass % and less than 60 mass %, and the ratio a/b of the content 'a' of Cu and the content 'b' of at least one of Co, Fe, and Cr satisfies $0.070 \leq a/b \leq 1.000$.

In addition, one mode of a WC-based cemented carbide member of the present invention is a laminate shaped body including WC particles, Cu, and a metallic bonding phase including at least one of Co, Fe, and Cr. The content of the WC particles is equal to or more than 40 mass %, the content of at least one of Co, Fe, and Cr is equal to or more than 25 mass % and less than 60 mass %, and the ratio a/b of the content 'a' of Cu and the content 'b' of at least one of Co, Fe, and Cr satisfies 0.070≤a/b≤1.000.

Besides, it is preferable that a Cu precipitated phase having an equivalent circle diameter of 10 to 50 nm be dispersedly precipitated in the metallic bonding phase.

In addition, it is preferable that a Cu precipitated phase having an average particle diameter of 1 to 100 μm be dispersedly precipitated in the metallic bonding phase.

Besides, one mode of a manufacturing method for a WC-based cemented carbide member of the present invention includes a step of preheating a base material including a metal to or above 350° C., and a step of melting and solidifying a cemented carbide powder by use of a heat source to apply additive manufacturing to a surface of the base material. The cemented carbide powder includes WC, Cu, and at least one of Fe and Cr, the content of WC is equal to or more than 40 mass %, the content of at least one of Co, Fe, and Cr is equal to or more than 25 mass % and less than 60 mass %, and the ratio a/b of the content 'a' of Cu and the content 'b' of at least one of Co, Fe, and Cr satisfies 0.070≤a/b≤1.000.

In addition, the manufacturing method preferably includes a step of performing heat treatment on the cemented carbide member obtained by the additive manufacturing at a temperature equal to or more than 400° C. and less than 1250° C.

Advantage of the Invention

According to the present invention, it is possible to provide a WC-based cemented carbide powder with which a WC-based cemented carbide member excellent in high thermal conductivity and high abrasion resistance can be manufactured. In addition, it is possible to provide a WC-based cemented carbide member and a manufacturing method for a WC-based cemented carbide member that are based on the additive manufacturing method.

Problems, configurations, and advantages other than those described above will be clarified by the following description of an embodiment.

MODES FOR CARRYING OUT THE INVENTION

An embodiment of the present invention will be described in detail below referring to the drawings. Note that a numerical value range indicated by "to" herein is a range including the numerical values before and after "to" as equal to or more than and as equal to or less than. In addition, in the figures, the same or similar parts are denoted by the same reference characters, and the descriptions thereof are not repeated.

The present inventor, in investigating realization of both high thermal conductivity and high abrasion resistance of a WC-based cemented carbide, has investigated enhancement of thermal conductivity of a WC-based cemented carbide having a high content of a metallic bonding phase. Paying attention to Cu which is easily separated from the metallic bonding phase of the WC-based cemented carbide and which is high in thermal conductivity, the present inventor has found out that addition of Cu enhances thermal conductivity.

On the other hand, it has been found that a WC-based cemented carbide powder to which a large amount of Cu is added becomes difficult to perform additive manufacturing. As a result of extensive and intensive investigations, a relation between a proper component ratio of the Cu amount that can be added to the WC-based cemented carbide and the additive manufacturing property has been found out. The present invention is based on the finding.

[WC-Based Cemented Carbide Powder]

As aforementioned, the WC-based cemented carbide powder of the present invention includes WC (tungsten carbide) which is a carbide of W (tungsten) and C (carbon), and Cu (copper), and further includes at least one of Co (cobalt), Fe (iron), and Cr (chromium). At least one of Co, Fe, and Cr is a raw material of the metallic bonding phase of WC. Herein, such a cemented carbide is referred to as a "WC-based cemented carbide." It is sufficient that the raw material constituting the metallic bonding phase is an element which is separated from Cu (does not form solid solution with Cu) in the manufacturing process of the WC-based cemented carbide to be described later.

The WC-based cemented carbide is a composite material in which hard WC is integrated by the metallic bonding phase, and its hardness is higher as the amount of WC in the WC-based cemented carbide member increases. Therefore, WC in the WC-based cemented carbide member is preferably at least equal to or more than 40 mass %.

An increase in the content of the metallic bonding phase in the WC-based cemented carbide member enhances the toughness of the WC-based cemented carbide member. In the WC-based cemented carbide powder to be used for manufacturing the WC-based cemented carbide member, in order to make the content of the metallic bonding phase equal to or more than 25 mass %, the content of at least one of Co, Fe, and Cr as the raw material of the metallic bonding phase is set equal to or more than 25 mass %. However, if the content of the metallic bonding phase is increased excessively, the hardness of the WC-based cemented carbide is lowered, and it becomes difficult to achieve a hardness necessary for a mold or the like. In addition, it becomes difficult to restrain lowering in the hardness due to a temperature rise in use of the mold. Therefore, in the WC-based cemented carbide powder of the present invention, in order to make the content of the metallic bonding phase less than 60 mass %, the content of at least one of Co, Fe, and Cr as the raw material of the metallic bonding phase is set to be less than 60 mass %. From the foregoing, the content of at least one of Co, Fe, and Cr is equal to or more than 25 mass % and less than 60 mass %.

The content of at least one of Co, Fe, and Cr is preferably 25 to 40 mass %, more preferably 30 to 40 mass %, from the viewpoint of the balance relation between toughness and hardness mentioned above.

Note that, for measurement of the content of the metallic bonding phase in the WC-based cemented carbide powder, X-Ray Fluorescence (XRF) conventionally used for analysis of composition of cemented carbide members can be used.

Cu is dispersed in the metallic bonding phase, to play the role of enhancing thermal conductivity of the WC-based cemented carbide member. While the WC-based cemented carbide member including Cu can enhance thermal conductivity, for example, Al or the like may also be included in addition to Cu.

By addition of Cu which is liable to be separated at low temperature to Co, Fe, or Cr, Cu is dispersed finely in the bonding phase, fine Cu precipitated particles (having an equivalent circle diameter of 10 to 50 nm) are formed, and thermal conductivity is enhanced. In addition, when Cu is added in an amount equal to or more than a solid solution limit of Co, Fe, or Cr, a phase in which comparatively large Cu particles (having an average particle diameter of 1 to 100 μm) are precipitated is formed (this phase is referred to as a coarse Cu precipitated phase in the present invention), simultaneously with the fine dispersion in the bonding phase, whereby further enhancement of thermal conductivity can be expected.

On the other hand, if Cu is added excessively, since the viscosity of a molten pool at the time of additive manufacturing in the manufacturing method for the WC-based cemented carbide member to be described later is raised, WC and the metallic bonding phase do not mix and a nonuniform structure is formed, and porosity (pores) is liable to be formed in the laminate shaped body. This is considered to be caused by easy evaporation of Cu and easy formation of an oxide due to Cu addition.

Further, in the case of additive manufacturing using a laser, an increase in the Cu content enlarges reflectance of the laser, a molten pool becomes not liable to be formed, and shaping becomes difficult. Therefore, the amount of Cu added is selected from the range of 0.1 mass %, exclusive, to 25 mass %, inclusive. Further, it is necessary to optimize the ratio of the content 'a' of Cu and the content 'b' of at least one of Co, Fe, and Cr. Therefore, the ratio a/b of the content 'a' and the content 'b' preferably satisfies $0.070 \leq a/b \leq 1.000$. A further preferable range is $0.090 \leq a/b \leq 0.800$, and more preferably $0.140 \leq a/b \leq 0.500$. Note that it is preferable that the remainder be unavoidable impurities.

[WC-Based Cemented Carbide Member]

Figure 1A:
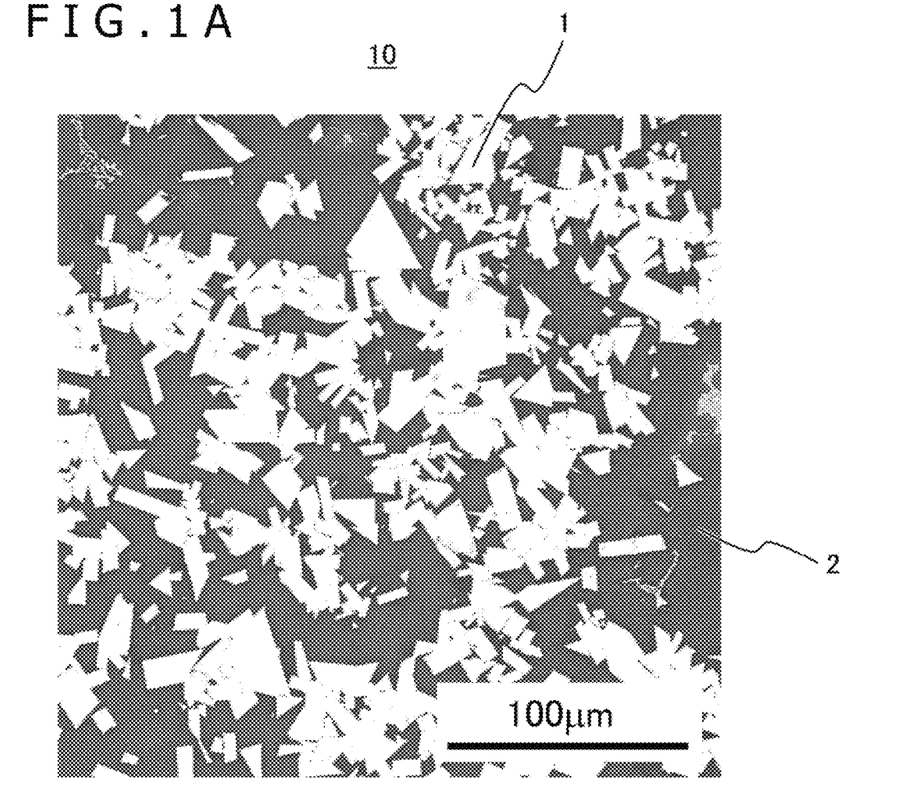
FIG. 1A is a backscattered electron image (BEI) of a WC-based cemented carbide member according to an embodiment of the present invention.
Figure 1B:
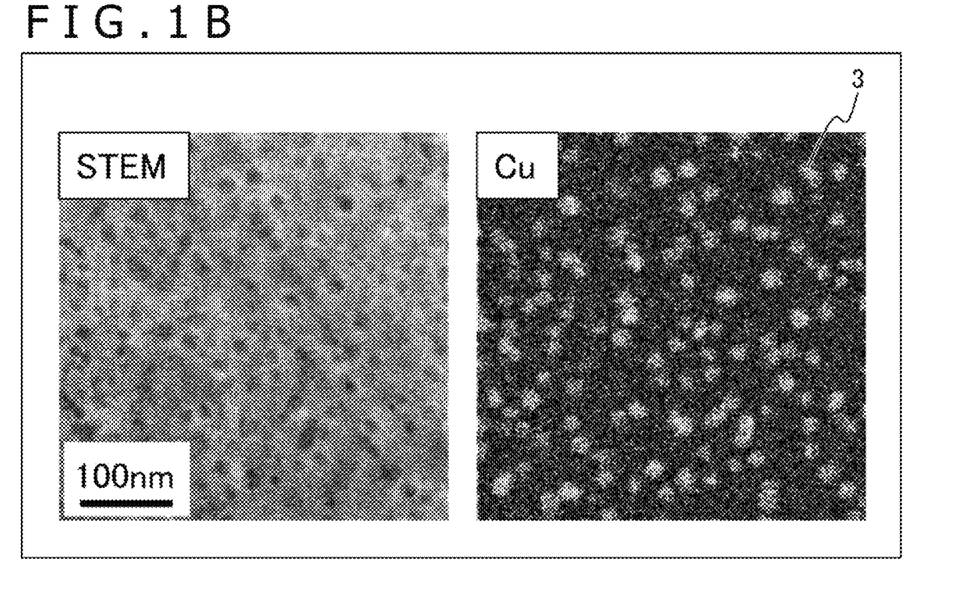
FIG. 1B depicts a transmission electron image, captured by a transmission electron microscope (STEM), of a WC-based cemented carbide member according to the embodiment of the present invention and a mapping of Cu by EDX.
Figure 1C:
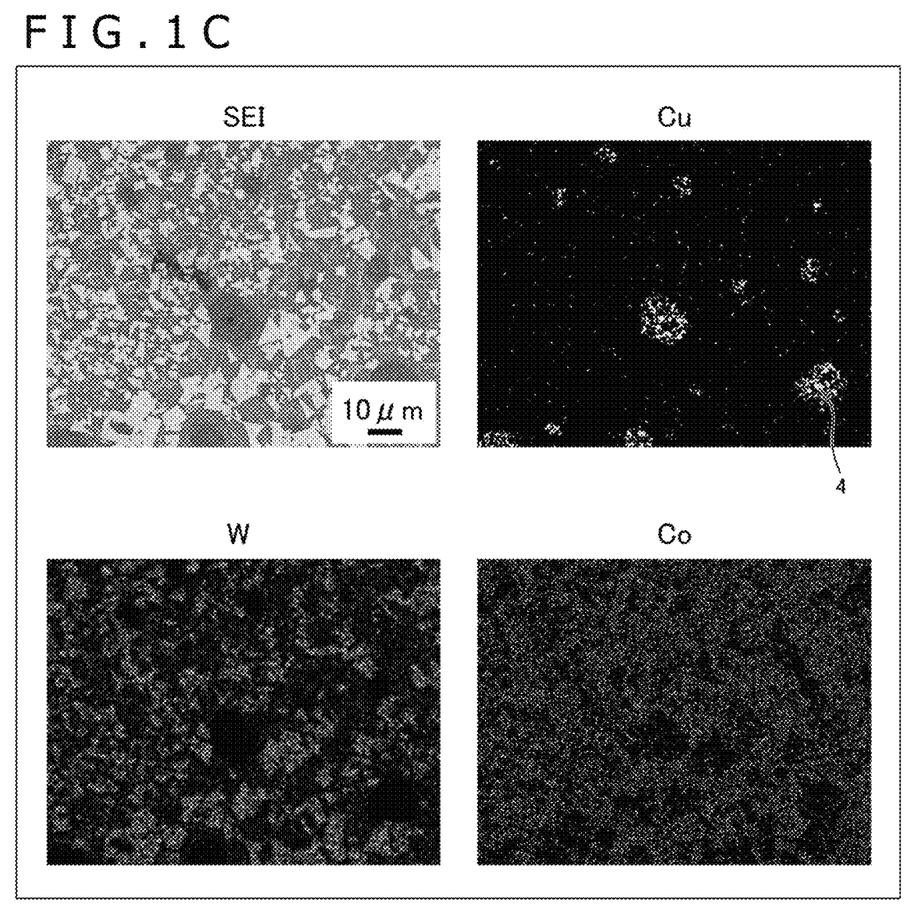
FIG. 1C depicts a secondary electron image (SEI) and element mappings of a WC-based cemented carbide member according to the embodiment of the present invention.

Observation photographs of the WC-based cemented carbide member of the present embodiment are depicted in FIGS. 1A to 1C. FIG. 1A is a Backscattered Electron Image (BEI), and FIG. 1B depicts a transmission electron image by a Scanning Transmission Electron Microscope (STEM) and a mapping of Cu by Energy Dispersive X-ray spectroscopy (EDX). FIG. 1C depicts secondary electron images (SEIs). Note that the specimen of FIG. 1B can be produced by forming a carbon protective film on a surface of a bonding phase of a WC-based cemented carbide member and thinning to a thickness on the order of 100 nm by sputtering using a Ga (gallium) ion beam. Note that FIG. 1A and FIG. 1C can be observed by use of Scanning Electron Microscope (SEM).

The WC-based cemented carbide member of the present embodiment is produced by applying additive manufacturing of the aforementioned WC-based cemented carbide powder to a surface of a base material, and has a melted and solidified structure. As depicted in FIG. 1A, the WC-based cemented carbide member 10 has WC particles 1 bonded by a metallic bonding phase 2 including at least one of Co, Fe, and Cr. In the WC-based cemented carbide member, a comparatively fine Cu precipitated phase 3 having an average particle diameter of 10 to 50 nm as depicted in FIG. 1B and comparatively coarse Cu precipitated particles 4 having an average particle diameter of 1 to 100 μm as depicted in FIG. 1C are dispersed. With respect to the "Cu precipitated phase" including the Cu precipitated particles 4, a detailed crystal structure has not been elucidated, but it is assumed to include Cu as a main constituent (equal to or more than 50 mass %) and have an FCC (Face-Centered Cubic) structure.

Note that the aforementioned "average particle diameter" is a value calculated by analyzing an image obtained by EPMA (Electron Probe Micro Analyzer) or EDX (Energy Dispersive X-ray spectrometry). Specifically, an image is binarized, and equivalent circle diameters of a plurality of, for example, on the order of 10, particles are measured and averaged. For example, equivalent circle diameters of particles observed in a range of $0.16 \ \mu m^2$ may be measured, and an average value thereof may be calculated.

Fe, Cr, or Co constituting the bonding phase of the WC-based cemented carbide of the embodiment and Cu undergo solid solution at high temperature, but there is few solid solution limits at low temperature, so that the Cu phase is separated and precipitated at the time of solidification. For example, heat treatment at or above 400° C. and below 1250° C. causes the Cu phase to be further precipitated, and further enhancement of thermal conductivity can be expected. The fine Cu precipitated phase 3 on the nanometer order depicted in FIG. 1B has particulate Cu particles having an average particle diameter of 10 to 50 nm precipitated substantially at regular intervals and uniformly in the bonding phase. Such a state is considered to be desirable for enhancement of thermal conductivity.

In addition, depending on the shaping conditions or Cu content, coarse Cu precipitated particles 4 (average particle diameter: 1 to 100 μm) on the micrometer order depicted in FIG. 1C may be dispersed, this also is considered to be contributing to enhancement of thermal conductivity. For example, as the Cu content is higher, coarse Cu particles are considered to be liable to be dispersed.

The Vickers hardness of the WC-based cemented carbide member of the embodiment is preferably equal to or more than 500 HV, more preferably equal to or more than 550 HV, and most preferably equal to or more than 600 HV. In addition, the thermal conductivity is preferably equal to or more than 40 W/(m·K), more preferably equal to or more than 60 W/(m·K), and most preferably equal to or more than 70 W/(m·K).

The WC-based cemented carbide member of the present embodiment has both high thermal conductivity and high abrasion resistance, and thus, is optimum for a mold for hot stamp.

The content of the metallic bonding phase in the WC-based cemented carbide member, like the aforementioned WC-based cemented carbide powder, is preferably equal to or more than 25 mass % and less than 60 mass %. Similarly, the ratio a/b of the content 'a' of Cu and the content 'b' of the metallic bonding phase preferably satisfies $0.070 \leq a/b \leq 1.000$. The content 'a' of Cu and the content 'b' of the metallic bonding phase in the WC-based cemented carbide member can be analyzed by X-ray fluorescence or the like, similarly to the WC-based cemented carbide powder.

Note that, in the Non-patent Document 1 mentioned above, 30 mass % of Cu powder is added to WC-10 mass %

Co, the amount of the metallic bonding phase is 37 mass %, and the ratio a/b of the content 'a' of Cu and the content 'b' of Co is 4.3, which is largely deviated from a/b in the present invention. While the document contains a description that "when 30% of Cu was added to adjust the process conditions, a smooth surface was formed," it is considered from the SEM photograph in the document that it is necessary to further enhance the density of the structure and to lower the Cu fraction.

[Manufacturing Method for WC-Based Cemented Carbide Member]

Figure 2:
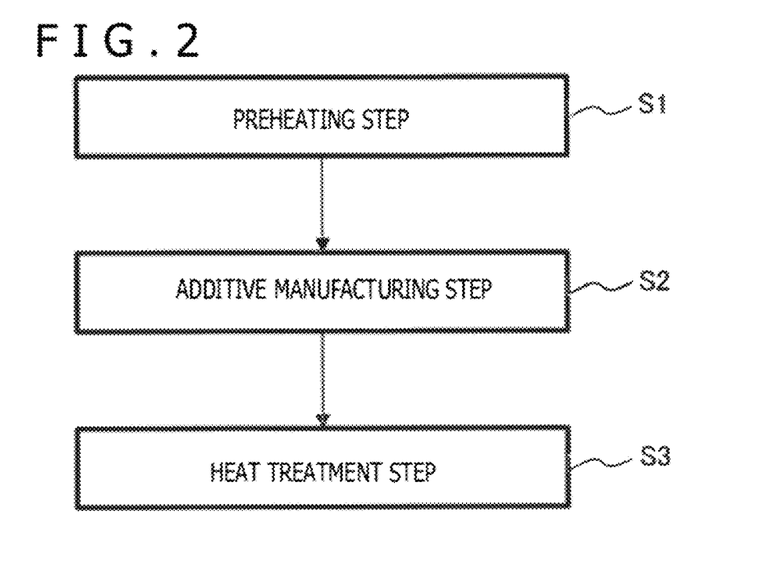
FIG. 2 is a flow chart depicting an example of a manufacturing method for a WC-based cemented carbide member of the present invention.

FIG. 2 is a flow chart depicting an example of the manufacturing method for a WC-based cemented carbide member of the present embodiment. As depicted in FIG. 2, the manufacturing method for the WC-based cemented carbide member includes a preheating step (S1), an additive manufacturing step (S2), and a heat treatment step (S3).

The WC-based cemented carbide member is laminate shaped as a whole of a shaped body by use of a WC-based cemented carbide powder, or laminate shaped by repeating melting -20 of a layer of a WC-based cemented carbide powder on a surface of a metallic base material. In general, a cemented carbide is formed by a liquid phase sintering method of heating to a temperature equal to or less than the melting point of a hard phase to sinter, but the WC-based cemented carbide member of the present embodiment is formed by an additive manufacturing method of partially melting and solidifying a WC-based cemented carbide powder raw material by a high energy heat source such as a laser, an electron beam, a plasma, and an arc (described as melting and solidification) and repeating this to manufacture a three-dimensional shaped body. Since the WC-based cemented carbide powder of the present embodiment has a high content of the metallic bonding phase, if it is formed by the liquid phase sintering method, it would be deformed by its own weight as described below, and forming becomes difficult. In this point, the additive manufacturing method shapes by instantaneous and partial melting and solidification, and, therefore, it is possible to restrain deformation by its own weight at the time of shaping.

More specifically, the liquid phase sintering is carried out at a high temperature around 1300° C., and, when the proportion of the metallic bonding phase is high, the shape as a structure cannot be maintained, and deformation like collapse in a barrel form occurs. As a result of the present inventor's investigation, it has been confirmed that conspicuous deformation occurs when the metallic bonding phase is equal to or more than 40 mass %. In the present invention, since the WC-based cemented carbide member is manufactured not by the liquid phase sintering but by additive manufacturing, the WC-based cemented carbide member can be manufactured without causing deformation which is generated in the case of the liquid phase sintering.

Hereinafter, each of steps S1 to S3 will be described in detail.

(S1) Preheating Step

A preheating step S1 is a step of preheating a metallic base material to a temperature equal to or more than 350° C. The preheating can be performed by high-frequency induction heating, a gas burner, an infrared electric heater, a heating furnace, an electron beam, or irradiation with a laser, for example. Note that, in the preheating step S1, the metallic base material is preferably preheated to a temperature equal to or more than 500° C., more preferably to a temperature equal to or more than 700° C. In addition, in the preheating step S1, from the viewpoint of preventing deformation of the metallic base material by its own weight, the metallic base material is preferably preheated to a temperature equal to or less than 1300° C., more preferably 1000° C.

By preheating the metallic base material to a temperature equal to or more than 350° C. in the preheating step S1, in the next additive manufacturing step S2, generation of cracking or exfoliation between the WC-based cemented carbide shaped body and the base material can be restrained. Specifically, by preheating the base material to or above a predetermined temperature in the preheating step S1, the temperature gradient of the WC-based cemented carbide shaped body and the base material at the time of additive manufacturing becomes gentle in the additive manufacturing step S2, and deformation due to thermal stress can be restrained and residual stress can be moderated. In addition, by preheating the base material to or above 500° C. in the preheating step S1, fine cracks which might be generated at the shaped part due to thermal stress in the additive manufacturing step S2 can be more securely restrained.

(S2) Additive Manufacturing Step

The additive manufacturing step S2 is a step of additive manufacturing the aforementioned WC-based cemented carbide powder of the present invention on a surface of the aforementioned metallic base material. The system of additive manufacturing is not particularly limited; for example, directed energy deposition system such as laser metal deposition, powder bed fusion system, Powder Plasma Transferred Arc Welding, and the like can be used. As a heat source, a laser, an electron beam, a plasma, an arc, and the like can be used. Among others, the laser permits a comparatively small irradiation spot, and is preferable since the laser can be used at an atmospheric pressure.

The WC-based cemented carbide powder can be a granulated powder obtained by putting a raw material powder (on the order of 0.1 to 50 μm) including WC, Cu, and at least one of Co, Fe, and Cr described above and paraffin wax in an amount of 2 mass % based on the total amount (100 mass %) of the raw material powder into an attritor, then wet mixing the material with ethyl alcohol (water content less than 10%) as an adjuvant, and thereafter granulating and drying by a spray drier.

Note that the wax in the granulated powder would cause generation of internal defects in additive manufacturing, and it is desirable to perform degreasing at 400° C. to 600° C. In addition, the degreased granulated powder is weak in bonding force and would be pulverized when supplying the powder in additive manufacturing, and, therefore, it is desirable to use a powder enhanced in bonding force by tentative sintering at 1000° C. to 1400° C. Further, in the case where additive manufacturing is conducted by the powder bed fusion system, shaping accuracy is lowered if the fluidity of the powder is poor, and, therefore, it is desirable, for example, to enhance the fluidity by enhancing sphericity by thermal plasma liquid droplet refining which is a refining method of passing the granulated powder through a high-temperature region of a plasma or the like. Note that not only the granulated powder but also a powder produced by a gas atomizing method or a water atomizing method may be used. For enhancing shaping accuracy, the fluidity (a value measured according to JIS Z2502) of the powder is desirably 10 to 25 sec/50 g.

(S3) Heat Treatment Step

The heat treatment step is a step of heat treating the aforementioned shaped body (cemented carbide member) of the metallic base material and the WC-based cemented carbide at a temperature equal to or more than 400° C. and less than 1250° C. As a result, Cu in solid solution in the bonding phase of the laminate shaped cemented carbide is precipitated, whereby thermal conductivity can be enhanced. The heat treatment temperature is preferably equal to or more than 450° C. and less than 1250° C., more preferably equal to or more than 500° C. and less than 1250° C., and most preferably 500° C. to 1200° C. The heat treatment time is preferably 1 to 12 hours, more preferably 3 to 10 hours, and most preferably 5 to 8 hours.

The atmosphere when carrying out the heat treatment may be vacuum or an inert gas atmosphere, but an inert gas atmosphere is preferred. By conducting the heat treatment in the inert gas atmosphere, precipitation of Cu can be accelerated at a high heat treatment temperature on the order of 1200° C., and, on the other hand, evaporation of Cu can be restrained, that is, a Cu precipitated phase (Cu precipitated particles) can be easily accumulated in the bonding phase.

In a molten part during additive manufacturing, WC is dissolved in Co, so that an η phase ($W_3Co_3C$, $W_6Co_6C$) is present in the shaped body solidified by quenching. Since the η phase is hard and excellent in abrasion resistance, the η phase may be left as a structure. On the other hand, since the η phase is also an embrittled phase, it is not suitable for a part required of toughness. It has been known that the η phase is separated into a WC phase and a Co phase when heat treated at or above 1100° C. Therefore, heat treatment at a temperature equal to or more than 450° C. and less than 1250° C. is effective for precipitation of Cu and decomposition of the η phase.

By the aforementioned heat treatment, the Cu phase is further precipitated, whereby further enhancement of thermal conductivity can be expected. The fine Cu precipitated phase 3 on the nanometer order has particulate Cu particles of an average particle diameter of 10 to 50 nm precipitated in the bonding phase substantially at regular intervals and uniformly. Such a state is considered to be desirable for enhancement of thermal conductivity.

Hereinafter, the present invention will be described more specifically by using Examples and Comparative Examples. Note that the present invention is not limited to these Examples.

EXAMPLES

Production of WC-Based Cemented Carbide Members for Test in Comparative Examples 1 and 2 and Examples 1 to 3

WC-based cemented carbide members for test having the component composition (unit: mass %) set forth in Table 1 below were individually produced. Note that the production method, for simulating the structure and properties of a laminate shaped body including melting and solidification, included putting predetermined amounts of WC powder as well as bulk materials of Co and Cu into an aluminum crucible, melting the materials by high-frequency melting, and cooling the melted material in the crucible. After the thus obtained ingot was processed into a predetermined shape, the shaped materials were served to each test. The WC-based cemented carbide members for test obtained in this way have the melted and solidified structure same as that of the laminate shaped body. While the solidification rate is slightly slower than that in the case of the additive manufacturing, it is within such a range as not to largely influence the properties.

TABLE 1

| | WC | Bonding phase (mass %) | |
|---|---|---|---|
| | (mass %) | Co | Cu |
| Comparative Example 1 | 60.0 | 40.0 | — |
| Comparative Example 2 | 60.0 | 37.5 | 2.5 |
| Example 1 | 60.0 | 36.5 | 3.5 |
| Example 2 | 60.0 | 35.0 | 5.0 |
| Example 3 | 60.0 | 30.0 | 10.0 |

In Table 1, the contents of Co in Comparative Examples 1 and 2 and Examples 1 to 3 are 40 mass %, 37.5 mass %, 36.5 mass %, 35 mass %, and 30 mass %, respectively. In addition, the ratio a/b of the content 'a' of Cu and the content 'b' of the bonding phase (Co) are 0, 0.067, 0.096, 0.143, and 0.333, respectively.

Next, specimens were cut out from the vicinity of the center of the blocks of the aforementioned WC-based cemented carbide members for test, and measurement of hardness and measurement of thermal conductivity were conducted. The test methods will be described below.

<Hardness Measurement>

After cutting, the section was polished to a mirror surface by use of emery paper and diamond abrasive grains, and hardness was measured at room temperature by a Vickers hardness tester at a load of 500 gf and a holding time of 15 seconds. The measurement was conducted five times, and an average value of the five times was recorded. The results of hardness measurement are set forth in Table 2 below.

<Thermal Conductivity Measurement>

With respect to the alloy members of Examples and Comparative Examples produced, thermal diffusivity a, density ρ, and specific heat c were measured, and thermal conductivity was determined from the following formula (1).

[Math 1]

$$\lambda = \alpha \cdot \rho \cdot c \qquad \text{Formula (1)}$$

(λ: thermal conductivity, α: thermal diffusivity, ρ: density, c: specific heat)

The thermal diffusivity was measured by use of a Xe flash method thermal diffusivity measuring device (made by Bruker-axs, model: Nanoflash LFA447 NETZSCH). The sample used for thermal diffusivity measurement was in a size of 9.5 mm×9.5 mm×1.5 mm, and was polished to #600 by waterproof emery paper. Fine graphite powder was applied to the polished sample by spray and blackening treatment was conducted to obtain a specimen.

The density was determined by the Archimedes method by using a specific gravity meter after the produced alloy was polished to #600 by emery paper.

In the measurement of specific heat, heat flows of specimen-filled pan, an empty pan, and a sapphire-filled pan were measured by use of a differential scanning calorimeter (made by TA Instruments, model: DSC Q2000), and specific heat was calculated by substituting measurements into the following formula (2). Note that the specimen cut to or below 50 mg was used, and the empty pan was used as a reference. In addition, the pans used for measurement were selected to be equal in weight.

[Math 2]   Formula (2)

$$C_p(\text{sample}) = C_p(\text{sapphire}) \times \frac{H(\text{sample}) - H(\text{empty})}{H(\text{sapphire}) - H(\text{empty})} \times \frac{m(\text{sapphire})}{m(\text{sample})}$$

($C_p$: specific heat, H: heat flow, m: mass)

The measurement results of thermal conductivity are also set forth in Table 2 below.

TABLE 2

|  | Thermal conductivity [W/(m · K)] | Vickers hardness [HV] |
|---|---|---|
| Comparative Example 1 | 27.3 | 580.2 |
| Comparative Example 2 | 25.4 | 617.5 |
| Example 1 | 40.6 | 646.8 |
| Example 2 | 66.0 | 632.8 |
| Example 3 | 73.6 | 592.5 |

With respect to Comparative Examples 1 and 2 and Examples 1 to 3, the results of tests of thermal conductivity and hardness after heat treatment at 500° C. for 5 hours are set forth in Table 3 below.

TABLE 3

|  | Thermal conductivity [W/(m · K)] | Vickers hardness [HV] |
|---|---|---|
| Comparative Example 1 | 32.6 | 585.4 |
| Comparative Example 2 | 30.1 | 625.2 |
| Example 1 | 42.9 | 659.4 |
| Example 2 | 71.1 | 620.0 |
| Example 3 | 81.3 | 609.6 |

From Tables 2 and 3, Comparative Example 1 is a conventional WC-based cemented carbide not including Cu, and, through it shows a hardness after heat treatment of equal to or more than 585 HV, its thermal conductivity is low as compared to Examples 1 to 3.

In Comparative Example 2, the ratio a/b of the content 'a' of Cu and the content 'b' of the bonding phase (Co) is outside the range of the present invention, and the amount of Cu is small, so that thermal conductivity is comparable to that in Comparative Example 1.

As contrasted to Comparative Examples 1 and 2, the thermal conductivities of the Examples 1 to 3 of the present invention exceeds 40 W/(m·K), clear lowering in hardness is not observed, and a hardness of equal to or more than 500 HV is secured. Therefore, both high thermal conductivity and high abrasion resistance are satisfied. Note that, in Examples 2 and 3 in which the Cu content is high, it is separately confirmed that coarse particulate Cu precipitated particles of 1 to 100 μm are present.

In addition, it is separately confirmed that a favorably shaped body can be obtained by use of the WC-based cemented carbides of Examples 1 to 3.

Production of WC-Based Cemented Carbide Members by Additive Manufacturing in Comparative Examples 3 and 4 and Examples 4 to 10

Next, WC-based cemented carbide members were produced by the additive manufacturing method.

As the WC-based cemented carbide powder, one having a content of WC of 60 mass %, a content of Co of 40 mass %, and a content of Cu of 20 mass % was used. The ratio a/b of the content 'a' of Cu and the content 'b' of the bonding phase (Co) was 0.630.

The additive manufacturing system was directed energy deposition system, and the shaping conditions were an output of 1800 W and a scanning speed of 800 mm/min.

As the step of additive manufacturing, first, on a surface of a laminate metallic base material preheated to 700° C., a melted and solidified layer of the WC-based cemented carbide powder was laminated repeatedly, to produce each WC-based cemented carbide member.

The thus produced WC-based cemented carbide members were subjected to heat treatment by setting some different heat treatment conditions. The heat treatment conditions, as set forth in Table 4, included a case of heat treatment in vacuum at 1100° C. for 5 hours (Example 4), a case of heat treatment in vacuum at 1150° C. for 5 hours (Example 5), a case of heat treatment in vacuum at 1175° C. for 5 hours (Example 6), a case of heat treatment in an argon gas atmosphere at 1175° C. for 5 hours (Example 7), a case of heat treatment in an argon gas atmosphere at 1175° C. for 10 hours (Example 8), a case of heat treatment in an argon gas atmosphere at 1200° C. for 2 hours (Example 9), and a case of heat treatment in an argon gas atmosphere at 1200° C. for 5 hours (Example 10). In addition, as Comparative Example 3, heat treatment was conducted in vacuum at 1250° C. for 2 hours.

Table 4 sets forth the results of evaluation of the precipitation degree of Cu and the remaining degree of the η phase in Examples 4 to 10 and Comparative Example 3. Here, the η phase is a brittle structure including $W_3Co_3C$ or $W_6Co_6C$, and is a harmful phase. The precipitation degree of Cu and the remaining degree of the η phase were judged based on whether or not the presence (precipitation) of Cu was confirmed in an observed region when sections of the WC-based cemented carbide members of Examples 4 to 10 and Comparative Example 3 were observed by a scanning transmission electron microscope (STEM) and mapping of Cu by energy dispersive X-ray spectrometry (EDX); a case where the precipitation was not confirmed was evaluated as "unacceptable," a case where the precipitation was confirmed was evaluated as "acceptable," a case where the precipitation was confirmed more was evaluated as "good," and a case where the precipitation was confirmed further more was evaluated as "excellent."

TABLE 4

|  | Cu content (mass %) | Heat treatment conditions | | | Precipitation degree of Cu | Remaining degree of η phase |
|---|---|---|---|---|---|---|
|  |  | Temperature (° C.) | Time (hour) | Atmosphere |  |  |
| Example 4 | 20 | 1100 | 5 | vacuum | good | acceptable |
| Example 5 |  | 1150 | 5 |  | good | acceptable |

TABLE 4-continued

| | Cu content (mass %) | Heat treatment conditions | | | Precipitation degree of Cu | Remaining degree of η phase |
|---|---|---|---|---|---|---|
| | | Temperature (° C.) | Time (hour) | Atmosphere | | |
| Example 6 | | 1175 | 5 | | acceptable | good |
| Example 7 | | 1175 | 5 | Ar | good | good |
| Example 8 | | 1175 | 10 | | good | good |
| Example 9 | | 1200 | 2 | | good | excellent |
| Example 10 | | 1200 | 10 | | good | excellent |
| Comparative Example 3 | | 1250 | 2 | vacuum | unacceptable | excellent |

Next, as set forth in Table 5, the precipitation degree of Cu and the remaining degree of the η phase were evaluated for each of divided cases of the contents of WC and Co, the content of Cu, heat treatment conditions, and aging treatment conditions. As a result, as indicated in Table 5, precipitation of Cu was confirmed, even in the case where only the heat treatment was performed as in Example 13 and in the case where neither the heat treatment nor the aging treatment after heat treatment was conducted. In addition, in the case where the amount of Cu was 5 mass % as in Example 11, remaining of Cu was confirmed even when the aging treatment was conducted in addition to the heat treatment. Even in the case where the aging treatment was performed after the heat treatment as in Example 12, precipitation of Cu was confirmed. Comparative Example 4 is an example in which the WC-based cemented carbide member does not include Cu.

WC, an η phase, and a Co phase. On the other hand, it can be confirmed that the structure of Example 13 includes WC, an η phase, a Co phase, and a Cu phase. By changing the heat treatment conditions, the remaining amount of the η phase can be further reduced.

As aforementioned, according to the WC-based cemented carbide member of the present Examples, even in the case where the heat treatment and the aging treatment in addition to the heat treatment are not conducted, Cu particles are precipitated in the bonding phase, thereby enhancing thermal conductivity. In addition, by subjecting the WC-based cemented carbide member of the present Examples to the heat treatment and further to the aging treatment after the heat treatment, a larger amount of Cu phase is precipitated in the bonding phase, thereby enhancing thermal conductivity.

TABLE 5

| | Content of WC (mass %) | Content of Co (mass %) | Content of Cu (mass %) | Heat treatment conditions | | Precipitation degree of Cu | Remaining degree of η phase |
|---|---|---|---|---|---|---|---|
| | | | | Heat treatment | Aging treatment | | |
| Comparative Example 4 | 60 | 40 | 0 | 1200° C. × 2 hours | 500° C. × 5 hours | — | good |
| Example 11 | 57 | 38 | 5 | | | good | good |
| Example 12 | 54 | 36 | 10 | | | good | good |
| Example 13 | 54 | 36 | 10 | | not conducted | good | good |
| Example 14 | 54 | 36 | 10 | not conducted | not conducted | good | acceptable |

With respect to Examples 11 to 14 and Comparative Example 4, hardness was measured by use of the same measuring method as aforementioned.

As shown in Table 6, in Examples 11 to 14, notwithstanding Cu was remaining, lowering in hardness was able to be restrained.

TABLE 6

| | Hardness (Hv) |
|---|---|
| Comparative Example 4 | 545 |
| Example 11 | 530 |
| Example 12 | 520 |
| Example 13 | 490 |
| Example 14 | 590 |

Figure 4:
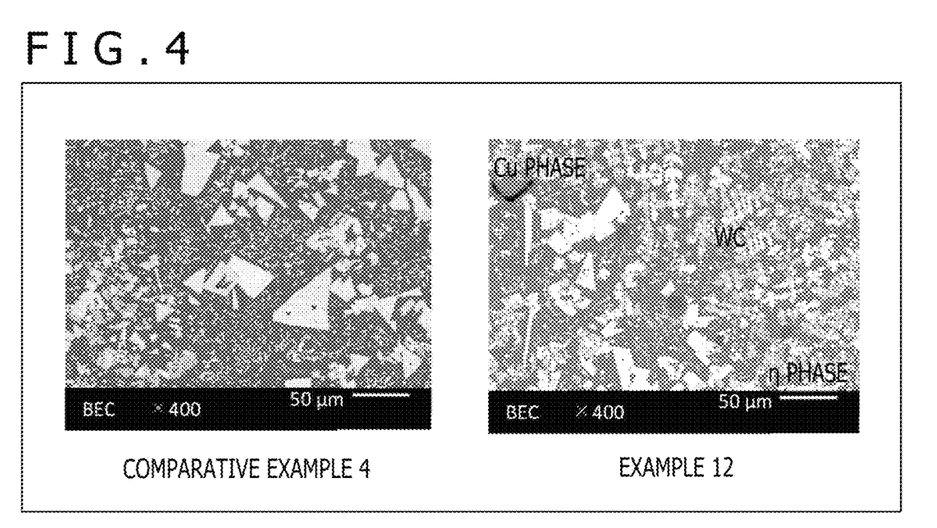
FIG. 4 is observation images, captured by a scanning electron microscope (SEM), depicting an example of comparison between presence and absence of heat treatment of a Cu-added WC-based cemented carbide member.

FIG. 4 depicts SEM photographs of shaped bodies of Comparative Example 4 and Example 12. It is seen that Comparative Example 4 does not include Cu but include Production of Mold by Use of WC-Based Cemented Carbide Member of Example 2

Figure 3:
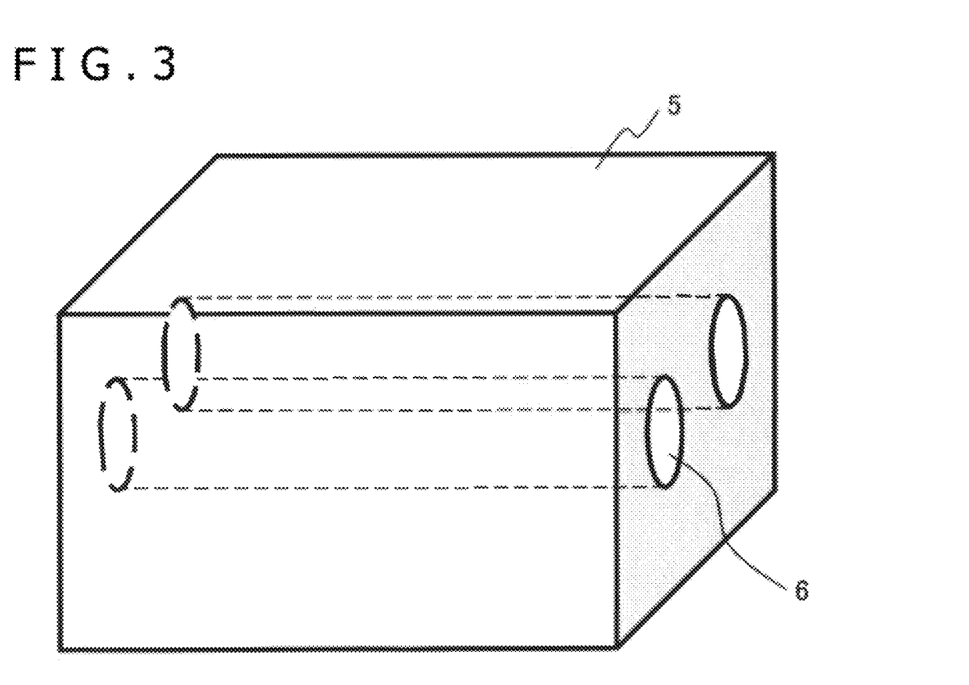
FIG. 3 is a schematic view depicting an example of a WC-based cemented carbide member of the present invention.

For confirming the effectiveness of the present invention, two molds each having a cooling hole were produced by additive manufacturing from each of maraging steel which is a conventional mold material and the alloy powder of Example 2. FIG. 3 is a schematic view depicting the mold for test which was produced from the material of Example 2. The mold 5 has a size of 50 mm×30 mm×30 mm, and has therein two water cooling holes 6 having a diameter of 10 mm. A plate member (workpiece) having a thickness of 2 mm heated to 800° C. was clamped between the two molds 5 produced, and the time until the temperature of the workpiece is lowered to or below 200° C. was measured. Note that the temperature was measured by a thermocouple attached to a side surface of the workpiece. In the case of using the maraging steel, 6.6 seconds was required until temperature reached 200° C. On the other hand, in the case of using the alloy of Example 2, the temperature reached 200° C. in 5.0 seconds, whereby the effectiveness of the present invention was able to be confirmed.

As aforementioned, it has been shown that the present invention can provide a WC-based cemented carbide powder from which a WC-based cemented carbide member excellent in high thermal conductivity and high abrasion resistance can be manufactured, a WC-based cemented carbide member, and a manufacturing method for a WC-based cemented carbide member.

Note that the present invention is not limited to the aforementioned Examples, and other modes considered within the scope of the technical thought of the present invention are included in the scope of the present invention unless departing from the gist of the present invention. For example, the configurations and treatment exemplified in the aforementioned Examples may be integrated or separated, as required, according to mounting modes or treatment efficiency. In addition, for example, the aforementioned Examples and modifications may be partially or wholly combined with each other within such ranges as not to be contradictory.

DESCRIPTION OF REFERENCE CHARACTERS

1: WC particles
2: Bonding phase
3: Cu precipitated phase
4: Cu precipitated particles
10: WC-based cemented carbide member
5: Mold
6: Water cooling hole

The invention claimed is:

1. A WC-based cemented carbide powder for additive manufacturing method consisting of:
   WC, Cu, and at least one of Co, Fe, and Cr,
   wherein a content of the WC in mass ratio is equal to or more than 40 mass %,
   a content of the at least one of Co, Fe, and Cr is equal to or more than 30 mass % and less than 60 mass %, and
   a ratio a/b of a content 'a' of the Cu and the content 'b' of the at least one of Co, Fe, and Cr satisfies $0.070 \leq a/b \leq 1.000$.

2. A WC-based cemented carbide member that is a laminate shaped body consisting of:
   WC particles, Cu, and a metallic bonding phase consisting of at least one of Co, Fe, and Cr,
   wherein a content of the WC particles is equal to or more than 40 mass %,
   a content of the at least one of Co, Fe, and Cr is equal to or more than 30 mass % and less than 60 mass %, and
   a ratio a/b of a content 'a' of the Cu and the content 'b' of the at least one of Co, Fe, and Cr satisfies $0.070 \leq a/b \leq 1.000$.

3. The WC-based cemented carbide member according to claim 2, wherein a Cu phase having an equivalent circle diameter of 10 to 50 nm is dispersedly precipitated in the metallic bonding phase.

4. The WC-based cemented carbide member according to claim 2, wherein a Cu phase having an average particle diameter of 1 to 100 μm is dispersedly precipitated in the metallic bonding phase.

5. d) A manufacturing method for a WC-based cemented carbide member, comprising:
   preheating a base material comprising a metal to or above 350° C.; and
   melting and solidifying a WC-based cemented carbide powder by use of a heat source to apply additive manufacturing to a surface of the base material,
   wherein the WC-based cemented carbide powder comprises consists of WC, Cu, and at least one of Co, Fe, and Cr,
   a content of the WC is equal to or more than 40 mass %,
   a content of the at least one of Co, Fe, and Cr is equal to or more than 30 mass % and less than 60 mass %, and
   a ratio a/b of a content 'a' of the Cu and the content 'b' of the at least one of Co, Fe, and Cr satisfies $0.070 \leq a/b \leq 1.000$.

6. The manufacturing method for the WC-based cemented carbide member according to claim 5, further comprising:
   performing heat treatment on the WC-based cemented carbide member obtained by the additive manufacturing at a temperature equal to or more than 400° C. and less than 1250° C.

7. The manufacturing method for the WC-based cemented carbide member according to claim 6, wherein the performing the heat treatment is carried out in an inert gas atmosphere.

8. The WC-based cemented carbide powder according to claim 1, wherein the ratio a/b of the content 'a' of the Cu and the content 'b' of the at least one of Co, Fe, and Cr satisfies $0.090 \leq a/b \leq 1.000$.

9. The WC-based cemented carbide powder according to claim 1, wherein the ratio a/b of the content 'a' of the Cu and the content 'b' of the at least one of Co, Fe, and Cr satisfies $0.140 \leq a/b \leq 1.000$.

10. The WC-based cemented carbide powder according to claim 1, wherein the ratio a/b of the content 'a' of the Cu and the content 'b' of the at least one of Co, Fe, and Cr satisfies $0.278 \leq a/b \leq 1.000$.

11. The WC-based cemented carbide member according to claim 2, wherein the ratio a/b of the content 'a' of the Cu and the content 'b' of the at least one of Co, Fe, and Cr satisfies $0.090 \leq a/b \leq 1.000$.

12. The WC-based cemented carbide member according to claim 2, wherein the ratio a/b of the content 'a' of the Cu and the content 'b' of the at least one of Co, Fe, and Cr satisfies $0.140 \leq a/b \leq 1.000$.

13. The WC-based cemented carbide member, according to claim 2, wherein the ratio a/b of the content 'a' of the Cu and the content 'b' of the at least one of Co, Fe, and Cr satisfies $0.278 \leq a/b \leq 1.000$.

* * * * *